United States Patent Office 2,734,806

Patented Feb. 14, 1956

2,734,806

GERMANIUM ETCHINGS

Sumner P. Wolsky, Waltham, Mass., assignor to Raytheon Manufacturing Company, Waltham, Mass., a corporation of Delaware No Drawing. Application August 24, 1954, Serial No. 451,953

5 Claims. (Cl. 41—42)

This invention relates generally to the surface treatment of the semiconducting material germanium which is to be used in electrical translation devices, and more particularly to an improved chemical etchant which effectively removes undesirable material from the surface of such a semiconducting material, thereby aiding in the obtainment of desirable electrical characteristics, and also provides for simpler and more efficient recovery of excess semiconducting material which might otherwise be lost in the etching process.

It is known to those skilled in the transistor and crystal diode art that proper surface treatment of the semiconducting material plays an extremely important role in the attainment of a device having desirable electrical characteristics. Although there is still some considerable conflict of opinion and doubt as to why such surface treatment improves the electrical characteristics of devices made of semiconducting material, it is apparently generally conceded that the major factors involved are the need for removing the superficial layer of disturbed material at the surface of the semiconductor left by mechanical preparation in order to expose the undisturbed crystal body which lies underneath and the need for removing foreign matter, such as dirt, from the surface of the material.

In addition to the immediate electrical requirements of contacts made to the semiconductor, other considerations exist which dictate that a thorough cleaning of the surface be performed. Microcracks and other structural flaws in a disordered surface layer could serve as points of congregation for adsorbed moisture and foreign ions introduced during cutting and lapping processes, and unless removed might result in later chemical changes which would affect the characteristics of the device. The apices of the cracks extending down into the underlying crystal act as points of concentration for mechanical stresses. The generation of noise may result due to thermal changes in the widths of the cracks lying across current paths with consequent fluctuations of the impedances to current flow. Various methods of accomplishing these objectives have been proposed among which are electrolytic treatment, ion bombardment, vapor etching, and treatment of the surface with a liquid chemical etchant. The use of the liquid chemical etchant has assumed a dominating position in the art, and it is with this type of etching method that the present invention is particularly concerned.

A good etch for germanium should possess as many of the following desirable features as possible:

1. The etch solution should easily clean the surface and leave it free from cracks and strains.
2. It should provide low surface recombination velocities; i. e., the carrier lifetime should be as long as possible.
3. The recovery of germanium from the spent etch solution should be as easy as possible.
4. The etch solution should be easily controlled, but still have a useful etch rate.
5. The etch solution should be stable and have a large capacity.

6. The rate of etching should vary only slightly with changing concentrations of the etch solution.
7. The etch solution should be easily handled, having vapors as inoffensive as possible.

The chemical etches presently utilized in processing germanium contain an oxidizing agent, a complexing agent, and usually some moderating agent to control the rate of etching. The majority of etch solutions contains hydrofluoric acid which serves as the complexing agent. However, the use of this acid has proven unsatisfactory in fulfilling many of the above requirements of a good etch solution. One of the major disadvantages is that the recovery of germanium from etch solutions containing fluorine is exceedingly difficult, since the germanium in the spent solution is in the form of the tightly bonded fluorogermanate complex $GeF_6$. The metal can be only partially recovered by precipitation as sodium fluorogermanate which then must be reduced with zinc or some other metal. The hydrofluoric acid etches also tend to be unstable, very dangerous to the health and safety of those handling them, and require the use of expensive plastic systems for storage and utilization of the etch solution.

In accordance with the present invention, an etch solution can be made which obviates many of the undesirable features of the previously employed etchants. It has been found by the inventor that an etch solution comprising a mixture of concentrated hydrochloric and nitric acid produces an etchant which, when employed in the surface treatment of germanium, resulted in the attainment of etched surface having excellent electrical characteristics. For example, the surface structure produced by an etch solution of 7 cc. hydrochloric acid
1 cc. nitric acid is unusual in that the etch pattern is very finely divided, a result which is desirable in the fabrication of certain types of germanium diodes or transistors.

Immersion of a germanium chip in the above etch solution was found to thin a germanium chip approximately 3 to 4 mils per hour at 35° C. At 100° C. this same solution will thin germanium chips at the rate of approximately 31 mils per hour. After removal from the solution the chip is washed in a non-contaminating bath, such as alcohol to remove the etch solution from the surface of the chip. If desired the etching rate of the hydrochloric acid solution can be controlled by the addition of a moderating substance, such as acetic acid or glycerol, or by varying the relative proportions of the etch constituents as well as by variation of the etch solution temperature. The etch solution of the present invention does not attack silicon, and therefore has been found to have considerable utility in etching germanium away from germanium-silicon alloys.

Since the reaction involved in formation of the hydrochloric acid etch solution is of the general unbalanced form $$Ge + HCl \text{ (in the presence of an oxidizing agent)} \rightarrow GeCl_4$$

the problem of recovery of the excess germanium is greatly simplified. The germanium tetrachloride need only be hydrolyzed and then reduced, in a hydrogen atmosphere for example, in order to remove the germanium from the solution. Hydrochloric acid does not attack glass, thus eliminating the need for polyethylene or similar plastic equipment which is necessary for use with etchants currently in vogue. In the preferred form the solution contains no volatile ingredients, thereby greatly improving its stability and allowing its use over a period of several days.

Although there has been described what is considered to be a preferred embodiment of the present invention, it should be understood that various modifications and adaptations thereof may be made without departing from the spirit and scope of the invention as defined in the appended claims.

What is claimed is:

1. The method of altering the surface characteristics of a body of germanium comprising inundating said surface with a chemical solution comprising hydrochloric acid and an oxidizing agent, and then washing said solution from said surface.

2. The method of altering the surface characteristics of a body of germanium comprising inundating said surface with a chemical solution comprising hydrochloric acid and nitric acid, and then washing said solution from said surface.

3. The method of altering the surface characteristics of a body of germanium comprising inundating said surface with a chemical solution comprising a mixture of hydrochloric acid, nitric acid and a moderating agent for controlling the rate of alteration, and then washing said solution from said surface.

4. The method of altering the surface characteristics of a body of germanium comprising inundating said surface with a chemical solution comprising a mixture of hydrochloric acid, nitric acid, and glycerol, and then washing said solution from said surface.

5. The method of altering the surface characteristics of a body of germanium comprising inundating said surface with a chemical solution comprising a mixture of seven parts by volume of hydrochloric acid and one part by volume of nitric acid, and then washing said solution from said surface.

References Cited in the file of this patent

UNITED STATES PATENTS

| | | |
|---|---|---|
| 2,429,107 | Petren | Oct. 14, 1947 |
| 2,441,300 | Vande Bunte | May 11, 1948 |
| 2,554,358 | Burke | May 22, 1951 |